US008416491B2

(12) United States Patent
Chen et al.

(10) Patent No.: US 8,416,491 B2
(45) Date of Patent: Apr. 9, 2013

(54) METHOD AND SYSTEM FOR THREE-DIMENSIONAL POLARIZATION-BASED CONFOCAL MICROSCOPY

(75) Inventors: Liang-Chia Chen, Taipei County (TW); Shih-Hsuan Kuo, Hsinchu County (TW); Sheng-Han Chen, Taipei (TW); Yi-Wei Chang, Yilan County (TW); Hau-Wei Wang, Taipei County (TW)

(73) Assignees: Industrial Technology Research Institute, Hsin-Chu (TW); National Taipei University of Technology, Taipei (TW)

( * ) Notice: Subject to any disclaimer, the term of this patent is extended or adjusted under 35 U.S.C. 154(b) by 415 days.

(21) Appl. No.: 12/647,903

(22) Filed: Dec. 28, 2009

(65) Prior Publication Data

US 2010/0321773 A1    Dec. 23, 2010

(30) Foreign Application Priority Data

Jun. 19, 2009  (TW) ................................ 98120565 A

(51) Int. Cl.
*G02B 21/00* (2006.01)
*G02B 21/06* (2006.01)

(52) U.S. Cl. ......... 359/371; 359/368; 359/385; 359/386

(58) Field of Classification Search .......... 359/368–390, 359/483.01–494.01, 577–590
See application file for complete search history.

(56) References Cited

U.S. PATENT DOCUMENTS

| 5,880,844 | A | 3/1999 | Seng | |
|---|---|---|---|---|
| 6,195,202 | B1 * | 2/2001 | Kusunose | ............... 359/368 |
| 6,798,511 | B1 * | 9/2004 | Zhan et al. | ............... 356/369 |
| 6,833,920 | B2 * | 12/2004 | Rassman et al. | ............... 356/369 |
| 6,838,650 | B1 | 1/2005 | Toh | |
| 7,092,093 | B2 * | 8/2006 | Ishihara | ............... 356/369 |
| 2005/0128896 | A1 * | 6/2005 | Katayama | ............... 369/44.23 |

(Continued)

FOREIGN PATENT DOCUMENTS

| CN | 1662790 | 8/2005 |
|---|---|---|
| CN | 1786810 | 6/2006 |

(Continued)

OTHER PUBLICATIONS

Kao, Wei-Chieh, Development of white Light Confocal Microscopy for Full-Filed Micro Surface Profilometry, 2005, 2 pages.

(Continued)

*Primary Examiner* — Thong Nguyen
(74) *Attorney, Agent, or Firm* — WPAT PC; Justin King

(57) ABSTRACT

A method and system for three-dimensional polarization-based confocal microscopy are provided in the present disclosure for analyzing the surface profile of an object. In the present disclosure, a linear-polarizing structured light formed by an optical grating is projected on the object underlying profile measurement. By means of a set of polarizers and steps of shifting the structured light, a series of images with respect to the different image-acquired location associated with the object are obtained using confocal principle. Following this, a plurality of focus indexes respectively corresponding to a plurality of inspected pixels of each image are obtained for forming a focus curve with respect to the measuring depth and obtaining a peak value associated with each depth response curve. Finally, a depth location with respect to the peak value for each depth response curve is obtained for reconstructing the surface profile of the object.

17 Claims, 22 Drawing Sheets

U.S. PATENT DOCUMENTS

| | | |
|---|---|---|
| 2006/0103724 A1 | 5/2006 | Jongsma et al. |
| 2007/0216999 A1 | 9/2007 | Tanibata et al. |
| 2012/0026311 A1* | 2/2012 | Ouchi et al. .................... 348/79 |

FOREIGN PATENT DOCUMENTS

| | | |
|---|---|---|
| TW | I247092 | 1/2006 |
| TW | I279580 | 4/2007 |
| TW | 200728682 | 8/2007 |
| TW | I291013 | 12/2007 |

OTHER PUBLICATIONS

Liang-Chia Chen and Yi-Wei Chang, "High accuracy confocal full-field 3-D surface profilometry for micro lenses using a digital fringe projection strategy," Engineering Materials vols. 364-366(2008), pp. 113.

* cited by examiner

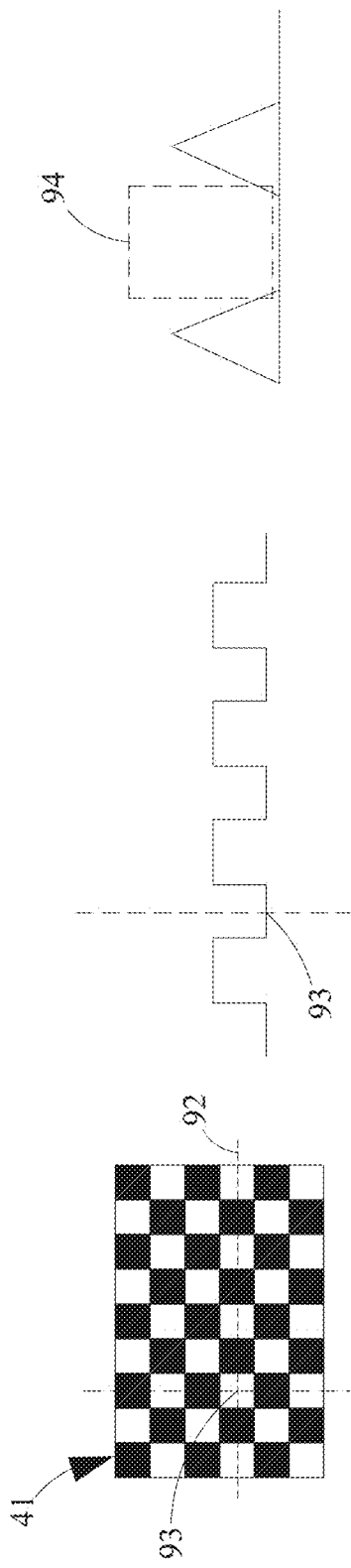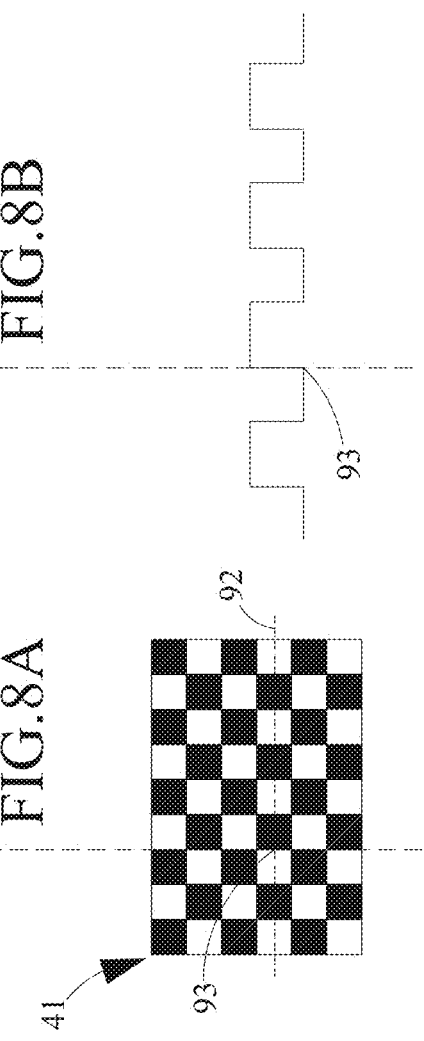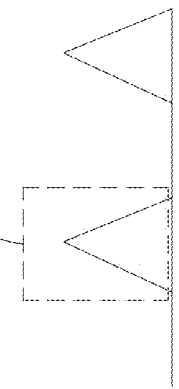

METHOD AND SYSTEM FOR THREE-DIMENSIONAL POLARIZATION-BASED CONFOCAL MICROSCOPY

TECHNICAL FIELD

The present disclosure relates to a surface profile measuring technique, and more particularly, to a three-dimensional confocal microscopy method and system for measuring surface profile of an object.

BACKGROUND

With the rapid advance of nano/micro-electromechanical systems (NMEMS) technology, there are increasing demands for innovative devices and methods capable of performing an inspection or measurement upon microstructures with high precision. Accordingly, those conventional contacted or non-contacted measurements are no longer considered to be effective enough in operation speed and precision for satisfying the demanding needs in modern measurement technologies. Moreover, in response to the improvement in our production industries, the requirement of automatic optical inspection equipment is increasing. The automatic optical inspection (AOI) equipment, being a powerful tool for assessing workmanship, can greatly enhance inspection repeatability, accuracy and throughput comparing with the use of those conventional manual inspections. Thus, AOI plays a vital role in test strategies designed to ensure the highest possible quality throughout each phase of a product's life cycle.

There has been a tremendous explosion in the popularity of confocal microscopy in recent years, due in part to the relative ease with which extremely high-quality images can be obtained from specimens prepared for conventional optical microscopy, and in its great number of applications in many areas of current research interest. Confocal microscopy offers several advantages over conventional optical microscopy, including controllable depth of field, the elimination of image degrading out-of-focus information, and the ability to collect series of optical sections from thick specimens. The key to the confocal approach is the use of spatial filtering to eliminate out-of-focus information or flare in specimens that are thicker than the plane of focus. As only one point is illuminated at a time in confocal microscopy, 2D or 3D imaging of the measured object requires scanning over a regular raster in the specimen that usually includes a fast horizontal scan in conjunction with a slower vertical scan for generating optical sections of different depths relating to the measured object. Thereafter, by the use of computers for performing a reconstructing process upon the obtained optical sections of different depths, an image containing information relating to the three-dimensional profile of the measured object can be obtained.

There are already many studies relating to the use of confocal microscopy, for instance, the 3-D profilometry using confocal microscopy with DMD-based fringe projection disclosed in TW Pat. Pub. No. I291013. Operationally, the aforesaid automatic surface profilometer deploys a DMD chip to project spatially encoded digital fringe patterns with dynamic light intensity, onto a measured object as the digital fringe patterns are designed with adaptive sinusoidal intensity modulation with respect to two orthogonal directions, and then use an imaging device to capture optical signals reflected from the surface of the measured object. Thereafter, the reflected optical signals are sent to a control unit where the focus indexes containing therein are analyzed so as to obtain depth information relating to the surface profile of the measured object. Thereafter, by the use of computers for performing a reconstructing process upon the obtained optical sections of different depths, an image containing information relating to the three-dimensional profile of the measured object can be obtained.

There is another confocal imaging system disclosed in U.S. Pat. No. 6,838,650. In the aforesaid confocal system, the field of view is preferably imaged onto an array image sensor and a pinhole array in a manner that multiple rows of sensing elements are provided in the array image sensor such that each row focuses on a different focus plane of the surface under inspection for enabling different focus planes of the surface to be imaged simultaneously using different rows of the area image sensor. Furthermore, U.S. Pat. No. 5,880,844 describes a hybrid confocal microscope. According to the aforesaid hybrid confocal microscope, the height of an object feature is computed according to the degree-of-focus of the images acquired by the different imaging paths as there is no image sensor attached to each of the imaging paths for acquiring images of the object. Image processing techniques are used to measure the degree-of-focus of an image acquired by a frame grabber from the image sensors of the multiple imaging paths. Thus, the variable degree-of-focus gathered from the multiple image paths and sensors are used to compute the height and, hence, the volume of the features of the object.

SUMMARY OF THE DISCLOSURE

In one embodiment, the present disclosure provides a method for three-dimensional confocal microscopy, comprising the steps of: providing a linear-polarizing structured light with a pattern; projecting the linear-polarizing structured light onto an object so as to form a plurality of beams containing focus information; performing a vertical scanning process upon the object; capturing the plurality of beams containing focus information during the vertical scanning process so as to form a series of images by a linear-polarizing imaging module; and analyzing the series of images for reconstructing the surface profile of the object.

In another embodiment, the present disclosure provides a system for three-dimensional confocal microscopy, comprising: a polarization module, for providing a linear-polarizing structured light; a microscopic objective lens module, for projecting the linear-polarizing structured light onto an object so as to form a plurality of beams containing focus information; a linear-polarizing imaging module; and a control module, for controlling a displacement device to perform a vertical scanning operation, acquiring the plurality of beams to form a series of images by the linear polarizing imaging module during the vertical scanning operation, and processing the series of images containing focus information for reconstructing the surface profile of the object.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 8A to FIG. 8F shows the relationship between focus indexes obtained before and after phase shifting associated with a phase-shifting structured light pattern projection.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

The present disclosure provides a method and system for three-dimensional confocal microscopy, which are specifically designed for inspecting and measuring microstructures having low surface reflectivity and high-slope surfaces. The aforesaid system is developed by employing a projection technique with a specially designed optical grating for enhancing high-frequency information. Moreover, it is designed to achieve full-field 3-D surface profilometry through combining the principle of shape from focus.

Furthermore, since the reflection intensity detected by the imaging device as well as the image contrast resulting from the structured-light pattern projection are decreasing with the increasing of the sloping of the surface to be measured, the present disclosure employs a high numerical aperture (NA) objective and structured-light having various pattern periods that are designed to work cooperatively with a phase-shifting means so as to not only effectively increase the inspecting range of the slope of the surface to be measured, but also enhance the resolution of 3-D surface profilometry.

It is noted that when measuring a V-groove microstructure by the use of a vertical scanning process, an undesired total-light-reflection image will occur as soon as the vertical scanning process reaches the bottom of the V-groove microstructure which will seriously affect the signal-to-noise ratio and cause a severe signal ambiguity problem along the vertical scanning axis as there can be more than one signal peaks to be existing in the depth response curve (DRC) resulting from the vertical scanning process that can easily cause error in the measurement result of the 3-D surface profilometry. To solve this problem, the present disclosure eliminates undesired spectacular reflection light by employing two linear polarizers which form a specific polarized angle in the system. Thereby, the disturbing noise level of the focus measure can be significantly reduced and thus the aforesaid signal ambiguity problem can be effectively resolved for achieving a 3-D surface profilometry with high accuracy.

Figure 1A:
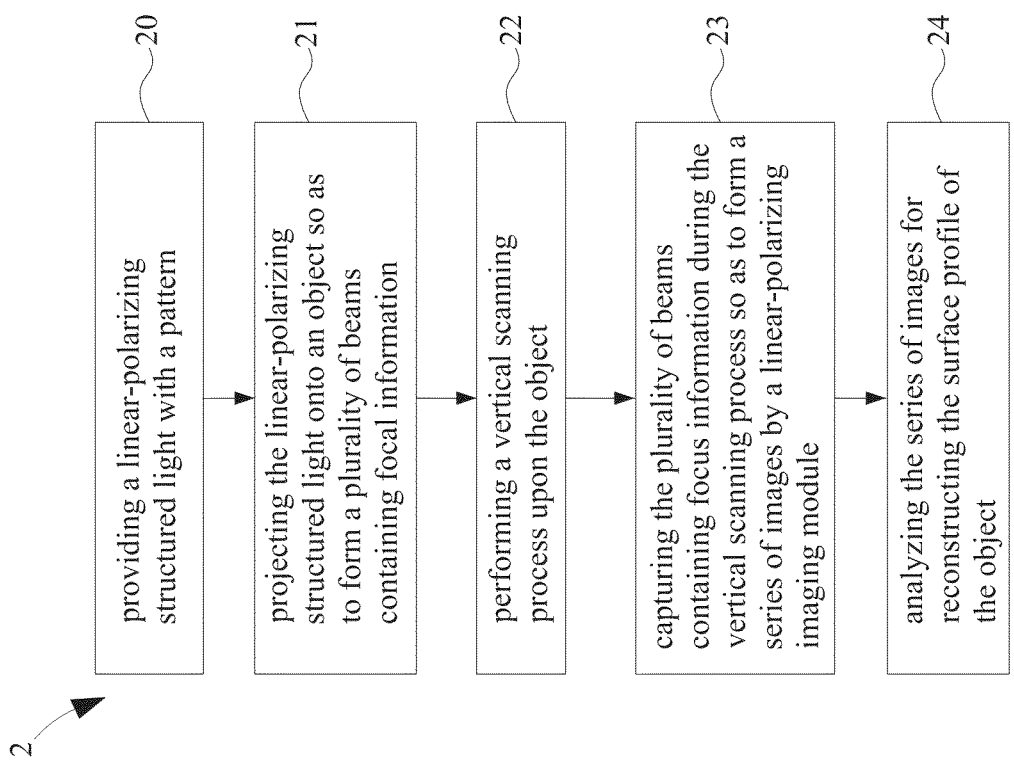
FIG. 1A is a flow chart depicting steps of a three-dimensional confocal microscopic method according to an embodiment of the present disclosure.
Figure 2A:
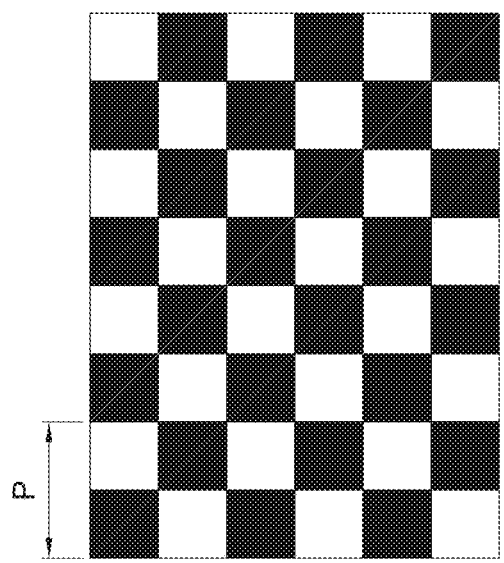
FIG. 2A is a schematic diagram showing a structured light with checkerboard pattern.
Figure 2B:
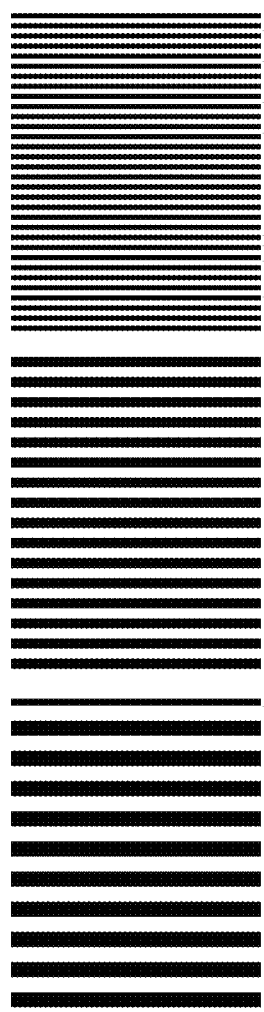
FIG. 2B and FIG. 2C show various structured lights with different patterns that are capable of being used in the present disclosure.
Figure 2C:
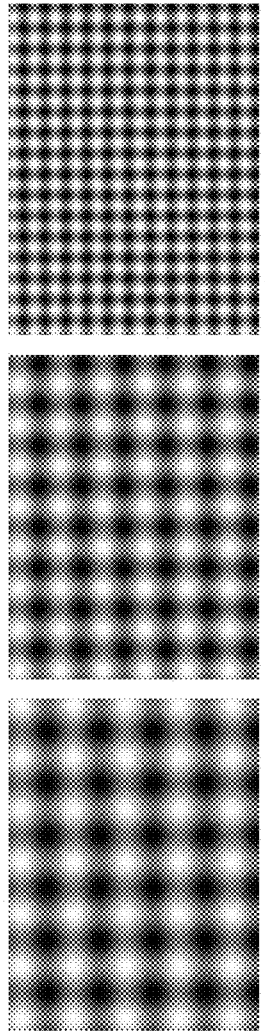

Please refer to FIG. 1A, which is a flow chart depicting steps of a three-dimensional confocal microscopic method according to an embodiment of the present disclosure. The confocal microscopic method 2 shown in this embodiment starts from step 20. At step 20, a linear-polarizing structured light with a pattern is provided, in that a light emitted from a light source is first being polarized by a linear polarizer and then being projected on an optical grating having structured pattern so as to form the aforesaid linear-polarizing structured light for polarized structured-light pattern projection. Moreover, the structured pattern of the optical grating can be, but should not be limited to, a checkerboard pattern, a sinusoid pattern, and a stripe pattern. In this embodiment, the pattern of the linear-polarizing structured light is modulated by the optical grating having a checkerboard pattern defined by a pattern period P, as shown in FIG. 2A. It is noted that the pattern period P can be varied according to actual measurement requirement, and also the pattern period P can be determined based upon the resolution required for measuring the surface profilometry. Please refer to FIG. 2B and FIG. 2C, which show various structured lights with different patterns that are capable of being used in the present disclosure. In FIG. 2B, the patterns of the structured light are stripe pattern with different periods. In FIG. 2C, the patterns of the structured light are sinusoid pattern with different periods. It is noted that the structured-light pattern projection can be achieved by the use of a digital micro projecting array such as a digital light projector (DLP) or a liquid crystal on silicon (LCOS), whichever is capable of projecting a structured light with a pattern onto a linear polarizer so as to form a polarized structured light with the pattern.

Then step 21 is performed. At step 21, the linear-polarizing structured light is projected onto an object so as to form a plurality of beams containing focus information; and then the flow proceeds to step 22. At step 22, a vertical scanning process is performed upon the object; and then the flow proceeds to step 23. At step 23, a linear-polarizing imaging module is enabled to capture the plurality of the beams containing focus information during the vertical scanning process and thereby form a series of images. It is noted that the linear-polarizing imaging module used in step 23 comprises an imaging device and at least a linear polarizer, which is capable of adjusting the measuring depth of field and range of measurement according to the size of the measured object so that the linear-polarizing imaging module can be adapted for measuring various objects of different sizes. To perform the vertical scanning process, at first, a measured area of the object as the initial scanning position of the vertical scanning process is selected, and then by varying the scanning depth at that selected area of the object, a series of images with respect to different scanning depths can be obtained by the use of the imaging device, i.e. during the focusing and defocusing processes along a series of different z-axis positions with respect to the distance between the surface of the object and the objective lens, the series of images are captured by the imaging device. In addition, the signal ambiguity problem resulting from the disturbing noise of the reflected light during the vertical scanning process can be eliminated by adjusting an angle between a polarizing axis with respect to a linear polarizer utilized to generate the polarizing structured light and a linear polarizer of the linear-polarizing imaging module.

Figure 1B:
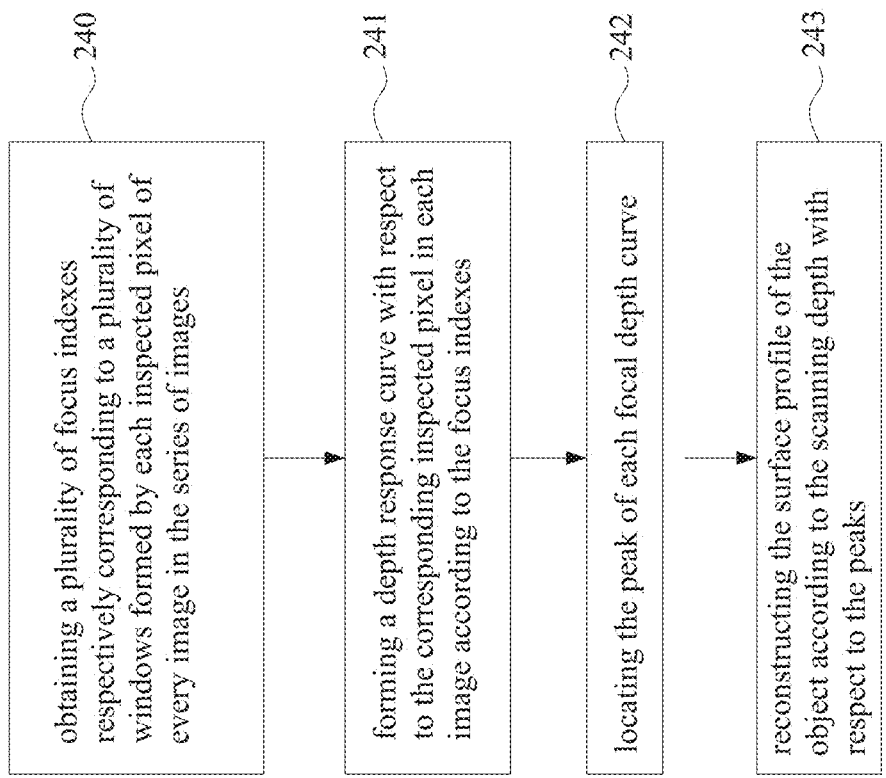
FIG. 1B is a flow chart depicting steps of a process for reconstructing surface profile of an object according to an embodiment of the present disclosure.
Figure 3A:
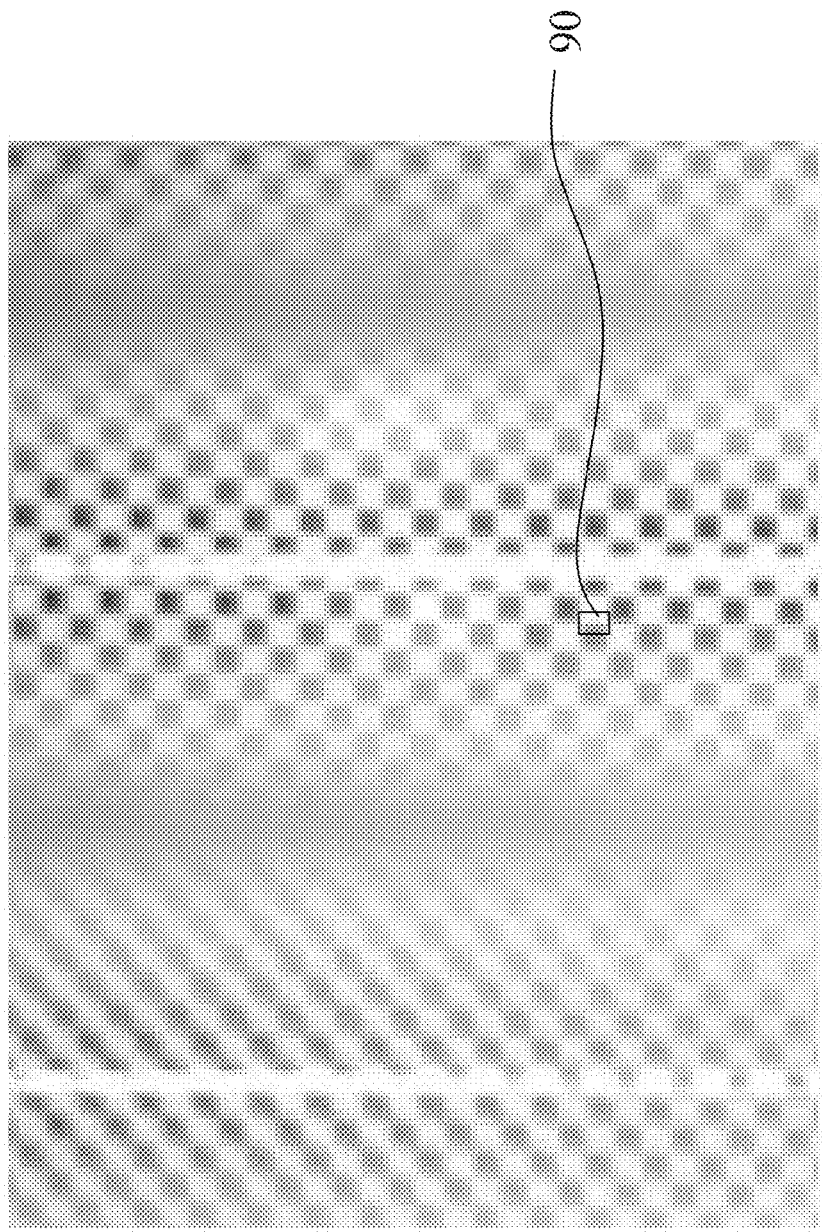
FIG. 3A shows an image of an object that is being projected by a structured light with patterns.
Figure 3B:
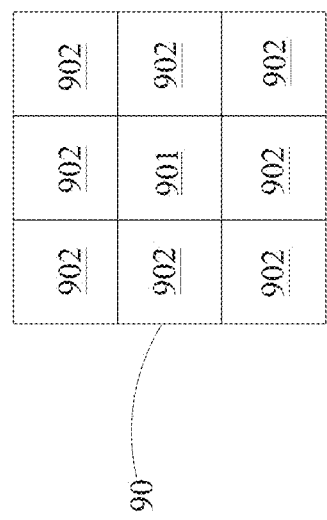
FIG. 3B shows the detail of the window defined with respect to each inspected pixel.
Figure 4C:
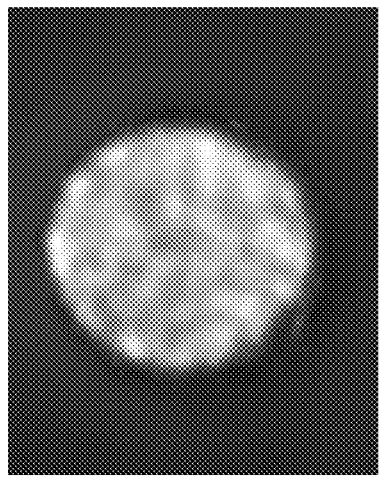
FIG. 4A to FIG. 4F show images obtained with respect to different depths during a vertical scanning process in the present disclosure.
Figure 4F:
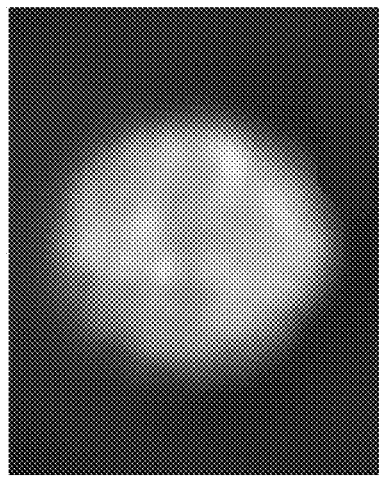
Figure 4B:
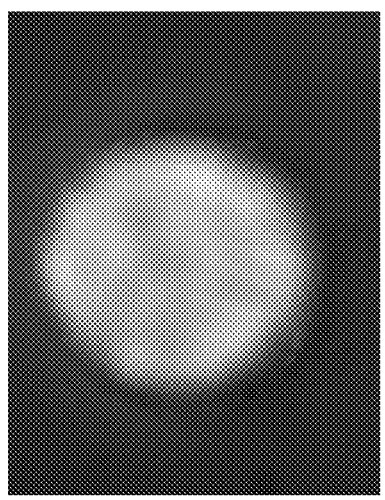
Figure 4E:
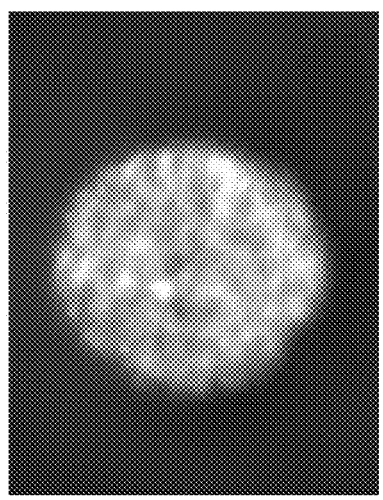
Figure 4A:
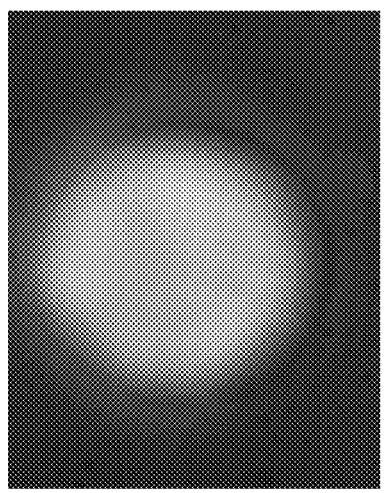
Figure 4D:
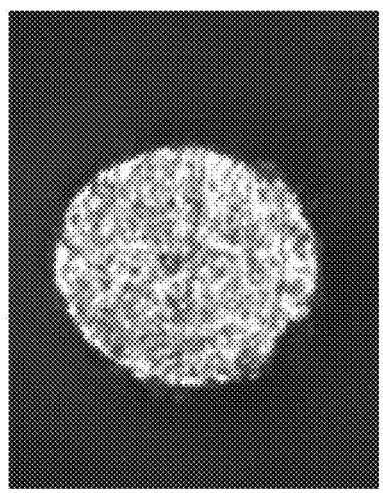

After the series of images are obtained, the flow proceeds to step 24 for analyzing the series of images for reconstructing the surface profile of the object. Please refer to FIG. 1B, which is a flow chart depicting steps of a process for reconstructing surface profile of an object according to an embodiment of the present disclosure. In this embodiment, the flow starts from step 240 in which a plurality of focus indexes respectively corresponding to a plurality of windows formed by each inspected pixel of every image in the series of images are obtained; and then the flow proceeds to step 241. Please refer to FIG. 3A, which shows an image of an object that is being projected by a structured light with patterns. As shown in FIG. 3A, it is feasible to define a plurality of windows 90 in each image of the series of images. It is noted that the size of each window can be determined according to actual requirement and thus is not limited by the present embodiment. For instance, the side of each window can be equal to odd pixel numbers such as three by three pixels square or, five by five pixels square defined in each image. In the present embodiment, the size of each window is defined to be equal to three by three pixels square. Please refer to the FIG. 3B, which illustrates the detail of the window defined with respect to inspected pixel of the image in the series of images. The window 90 is expanded from the inspected pixel 901. Since the grey level of a pixel alone does not convey any information about the blurring process, the sharpness criterion function must operate on a neighborhood of the inspected pixel, wherein the area containing the neighborhood pixels 902 of the inspected pixel and the inspected pixel 901 itself is called the window 90 illustrated in FIG. 3B. After that the focus index can be calculated according to the algorithm such as sum-modified-Laplacian (SML), which is further described hereinafter.

As defocusing is a kind of a low pass process, images with sufficient high-frequency information are considered to be images containing more details for profilometry. Thus, a good focus measure operator has to possess a capability to distinguish high-frequency information from low-frequency information. In addition, a high-pass filter for two-dimensional image is a second-order derivative which can be a Laplacian operator as following:

$$\nabla^2 I = \frac{\partial^2 I}{\partial x^2} + \frac{\partial^2 I}{\partial y^2} \quad (1)$$

wherein, I(x, y) is the intensity relating to the image position (x, y). However, when the aforesaid Laplacian operator is used for extracting characteristics of an image, the value of $$\frac{\partial^2 I}{\partial x^2}$$

and the value of $$\frac{\partial^2 I}{\partial y^2}$$

will sometimes cancel each other out resulting from the positive and negative of the direction with respect to x and y during calculating the second-order derivative by the Laplacian operator. Thus, an improved Laplacian operator is used as following:

$$\nabla^2 I = \left|\frac{\partial^2 I}{\partial x^2}\right| + \left|\frac{\partial^2 I}{\partial y^2}\right| \quad (2)$$

It is common to represent the Laplacian operator as a 3×3 window that is further being adjusted for matching with the characteristic size of image as following:

$$ML(x,y)=|2I(x,y)-I(x-\text{step},y)-I(x+\text{step},y)|+|2I(x,y)-I(x,y-\text{step})-I(x,y+\text{step})| \quad (3)$$

Thus, it is noted that the focus index for each window in the series of images is the sum of Laplacina operator shown as following:

$$F(i, j) = \sum_{x=i-N}^{i+N} \sum_{y=j-N}^{j+N} ML(x, y) \text{ for } ML(x, y) \geq T_1 \quad (4)$$

wherein, N is the window size used to compute the focus value; and $T_1$ is the threshold defined to eliminate the background noise.

Accordingly, each focus index represents the focus measure of its corresponding inspected pixel. Please refer to FIG. 4A to FIG. 4F, which show images obtained with respect to different depths during a vertical scanning process in the present disclosure. As shown in FIG. 4A to FIG. 4F, for a specific position on the object, the image clarity of object surface observed by a microscope is changing with the varying observation depth during the vertical scanning process and thus the series of images are obtained in a focusing/defocusing process with respect to the object surface. It is noted that the image with the best image clarity is the one shown in FIG. 4D.

Figure 5A:
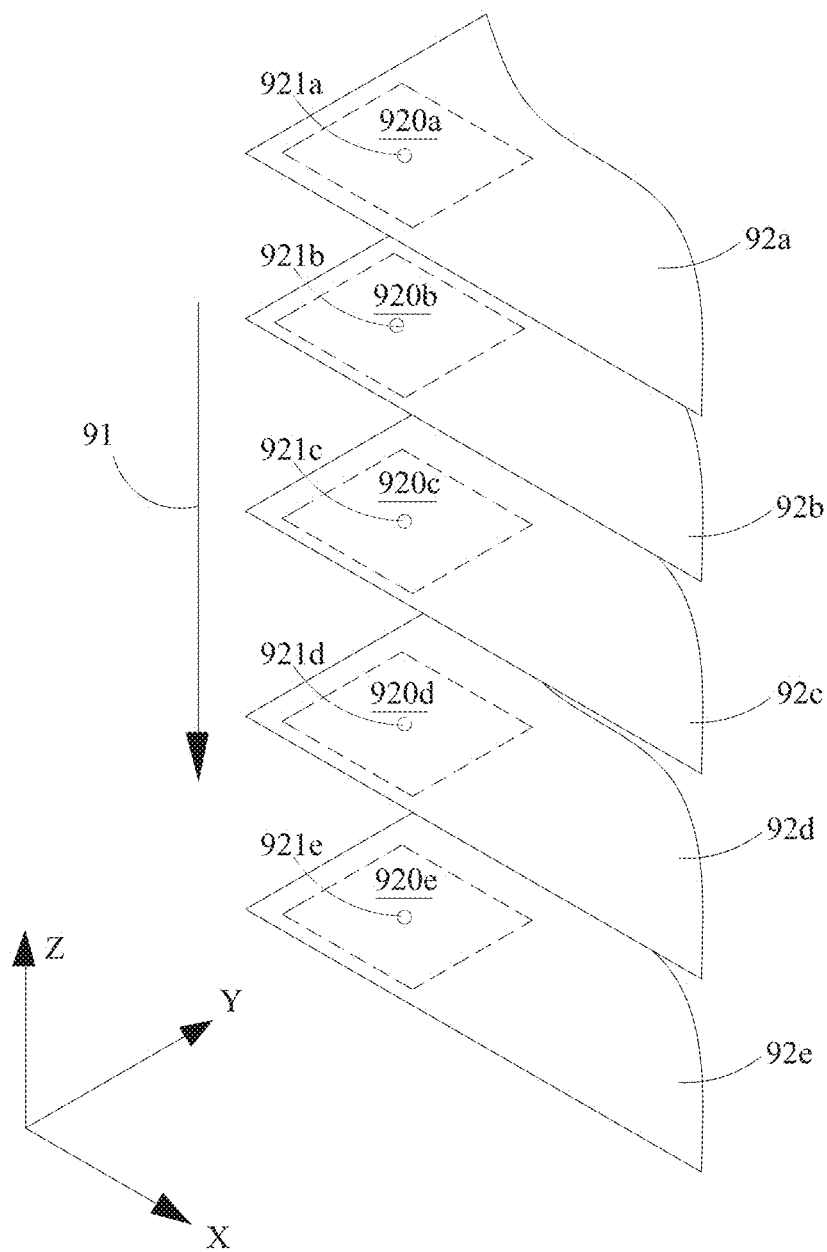
FIG. 5A is a schematic diagram showing a series of images with their corresponding windows as the series of images are obtained using confocal principle in the present disclosure.
Figure 5B:
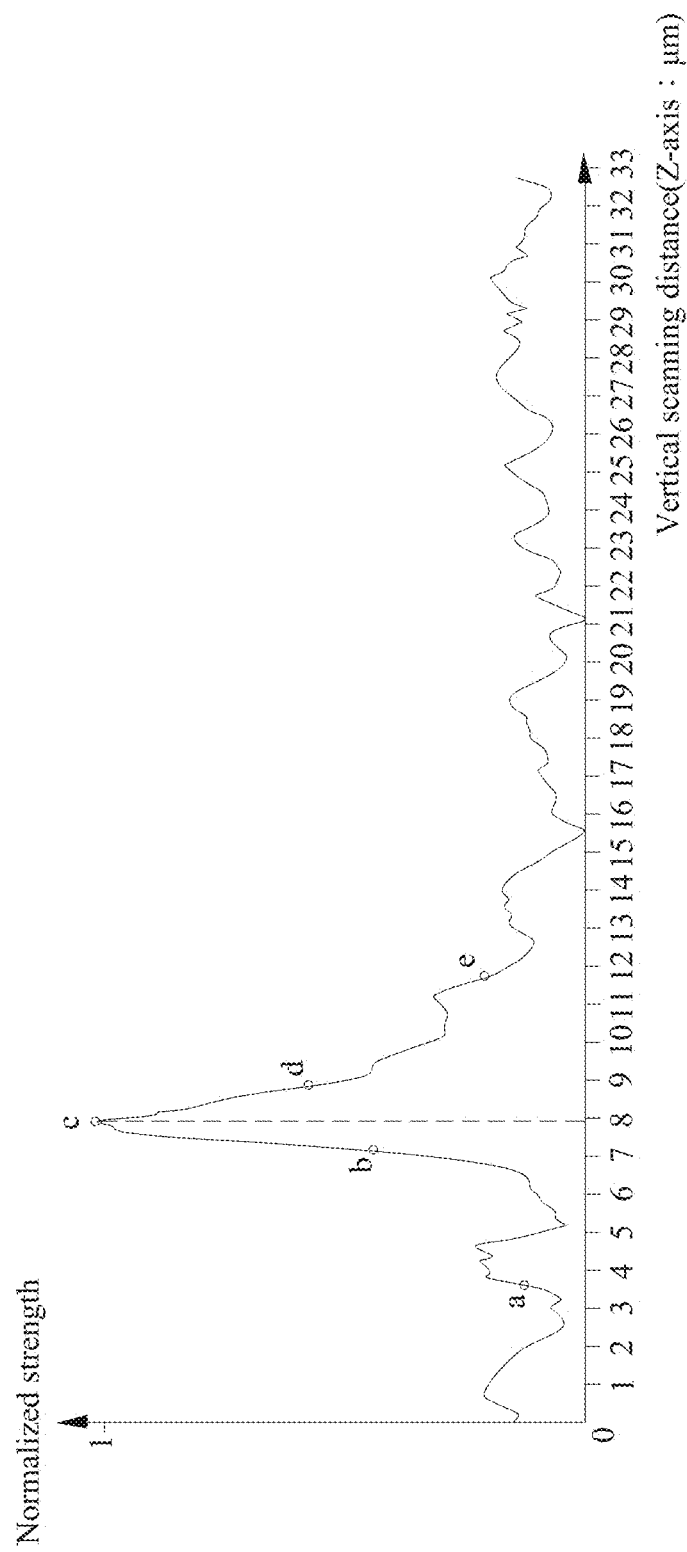
FIG. 5B shows an example of a depth response curve.

After the plurality of focus indexes with respect to the windows of each inspected pixel in every image are obtained, the flow proceeds to step 241. At step 241, a depth response curve is formed for corresponding inspected pixels in a different image of the series of images, as each inspected pixel is associated with a measured area of the object, according to the focus indexes of the measured area obtained respectively from the series of images; and then the flow proceeds to step 242. Please refer to FIG. 5A and FIG. 5B, which are a schematic diagram showing a series of images with their corresponding inspected pixels and an exemplary depth response curve. As shown in FIG. 5A, there is a series of five images 92a~92e obtained with respect to different scanning depth along a vertical scanning direction 91 that each of the five images 92a~92e contains a plurality of windows 920a~920e wherein each window 920a~920e is characterized by one focus index with respect to inspected pixel 921a~921e. Taking the five inspected pixels 921a~921e shown in FIG. 5A for example, as they are associated with the same measured area of the object and are obtained respectively and correspondingly from the series of five images 92a~92e, it is noted that by charting the focus indexes of the five inspected pixel 921a~921e in correspondence with their scanning depths, a depth response curve similar to the one shown in FIG. 5B can be obtained, wherein the depth response curve of FIG. 5B is a relation between the normalized focus indexes obtained from a plurality of windows corresponding to the same measured area in the series of images and the vertical scanning distance (Z). It is noted that the positions a, b, c, d, and e are the normalized focus indexes resulting respectively from the inspected pixels 921a~921e of FIG. 5A.

Employing the focus measure defined above, a depth response curve (DRC) of each measured pixel can be obtained from the series of images by the vertical scanning process, in which the peak of the DRC represents the focus plane position having the maximum high frequency content along the z-axis and thus indicates the actual height of that measured position in the images. FIG. 5B is an exemplary DRC, in which the horizontal coordinate represents the vertical scanning distance, i.e. the depth of the vertical scanning; and the vertical coordinate represents the normalized intensity with respect to the focus index, by that the DRC can illustrate the focus measure obtained along the vertical scanning axis with respect to a measured position of the object. Therefore, the peak of the DRC represents the actual height of that measured position of the object.

After obtaining the DRCs, the flow proceeds to step 242 for searching and locating the peak of each DRC as each peak associated with each DRC is the indication of the actual height of different measured surface position of the object. For instance, the height of the location indicated by the peak of the DRC in FIG. 5B is 7.9 μm. As the peak of each DRC is corresponding to the actual height of one measured surface position of the object, wherein the measured surface position is corresponding to the location of specific window, such as window 920a, for example. The combination of the heights and surface position indicated by the peaks of the DRCs with respect to different location of inspected pixels in one image can be used for reconstructing the surface profile of the object, as illustrated in step 243.

Figure 6:
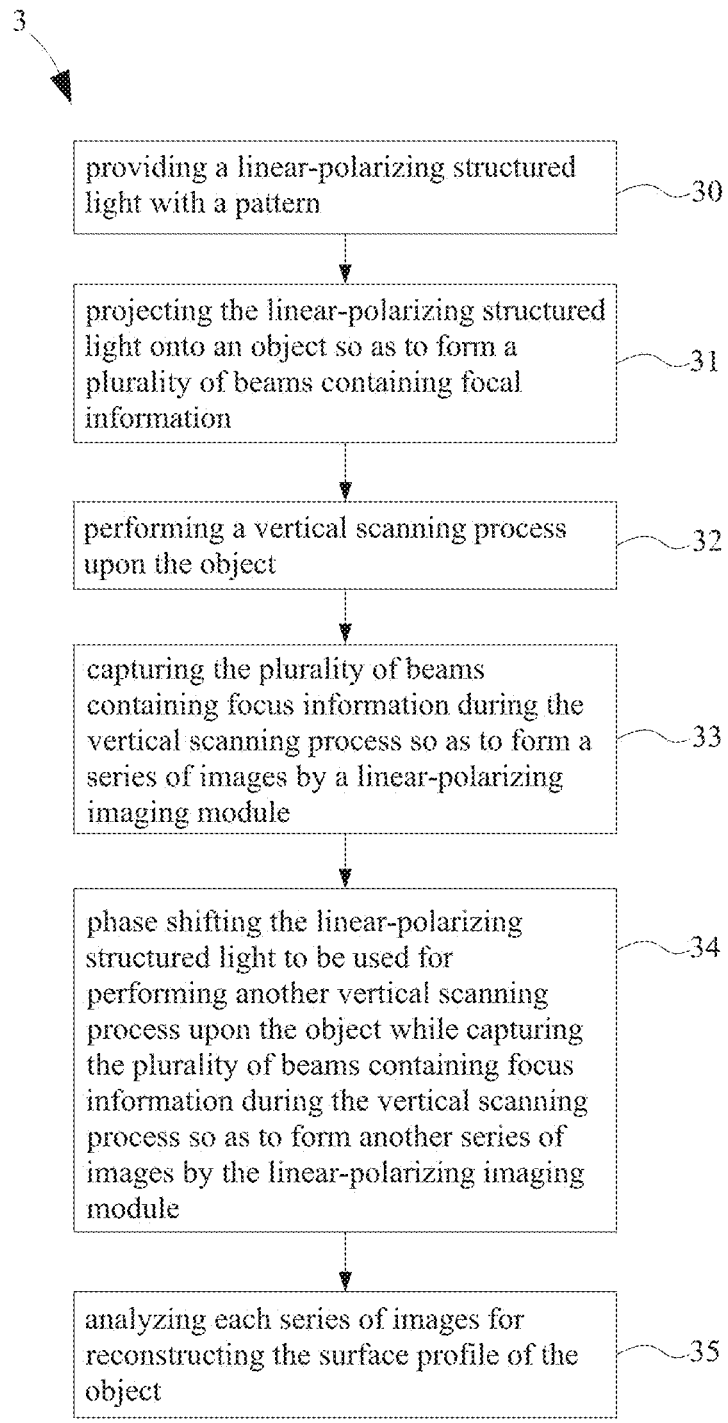
FIG. 6 is a flow chart depicting steps of a three-dimensional confocal microscopic method according to another embodiment of the present disclosure.
Figure 7B:
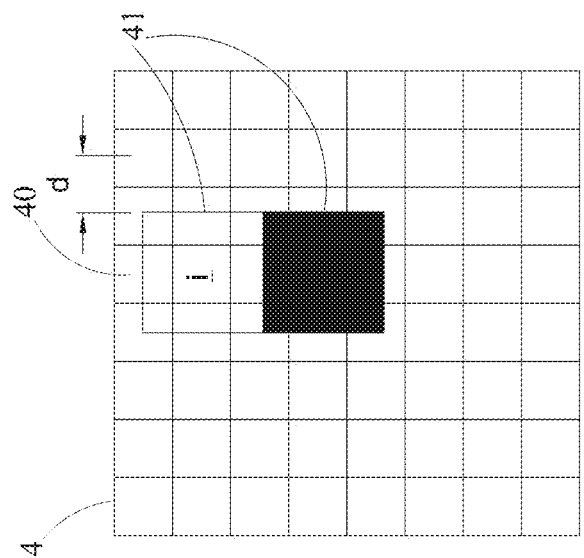
FIG. 7B is a schematic diagram showing the detection of an imaging device, e.g. CCD or CMOS, with respect to a structured light pattern projection after phase shifting.
Figure 7A:
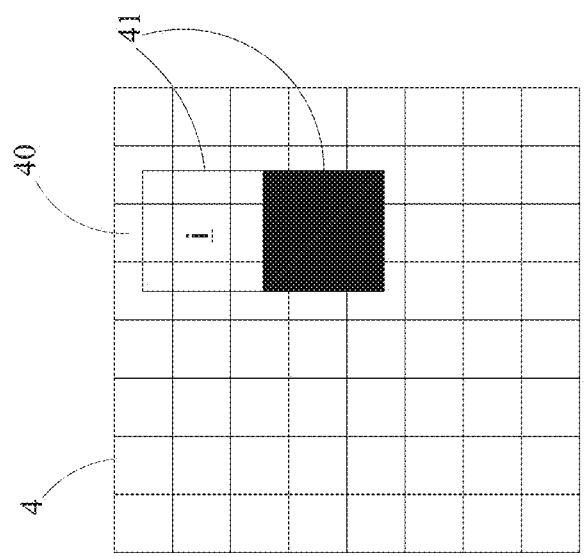
FIG. 7A is a schematic diagram showing the detection of an imaging device, e.g. CCD or CMOS, with respect to a structured light pattern projection before phase shifting.

Please refer to FIG. 6, which is a flow chart depicting steps of a three-dimensional confocal microscopic method according to another embodiment of the present disclosure. The three-dimensional confocal microscopic method 3 shown in this embodiment is similar to the one shown in FIG. 1A in steps 30~33 and step 35, but is different in step 34, in that the grating phase of the structured light is shifted for achieving higher measurement resolution with respect to the surface profile of the object as the phase-shifted structured light is used in an additional vertical scanning process for capturing another series of images to be used for reconstructing the surface profile. It is noted that in the structured-light focus detection method without phase shifting, the valid measured points only lies along the edge boundary of the black and white patterns while the rest of points still encounters difficulty in obtaining the corresponding effective DRC. Thus, for those surface locations of the object that are not laid on the edge boundary of the black and white patterns, they will not respond as a high-frequency signal and reflect in the DRCs so that the heights of those locations will not be obtained while reconstructing the surface profile of the object. Please refer to FIG. 7A, which is a schematic diagram showing the detection of an imaging device, e.g. CCD or CMOS, with respect to a structured light pattern projection before phase shifting. In FIG. 7A, when an imaging device 4 containing a plurality of imaging elements 40 is enabled to detect an object projected by a structured light of black and white patterns 41, the imaging elements 40 corresponding to the edge boundary of the black and white pattern 41 will respond to high-frequency signals while those imaging elements 40 corresponding to the middle area i of the black and white pattern 41 will not so that the height information of the positions on the object's surface that are located with respect to those middle areas i will not be detected and used for reconstructing the surface profile of the object.

Please refer to FIG. 8A to FIG. 8C, which shows the relationship between focus indexes obtained before phase shifting associated with a phase-shifting structured light pattern projection, wherein the FIG. 8A represents the linear polarized structured light with checkerboard pattern, the FIG. 8B represents the optical signal intensity with respect to the cross section 92, while the FIG. 8C represents the focus index value of location 93. For example, the locations of the patterned image at location 93 on the cross section 92 is not exactly on the edge boundary of the black and white patterns which can be demonstrated in the gray level measured along the section 92 of the image shown in FIG. 8B, the location 93 will not respond high-frequency signals and thus no focus indexes can be obtained, as illustrated in the area 94 of FIG. 8C. Therefore, the height information of the positions at location 93 will not be detected and used for reconstructing the surface profile of the object.

Figure 9A:
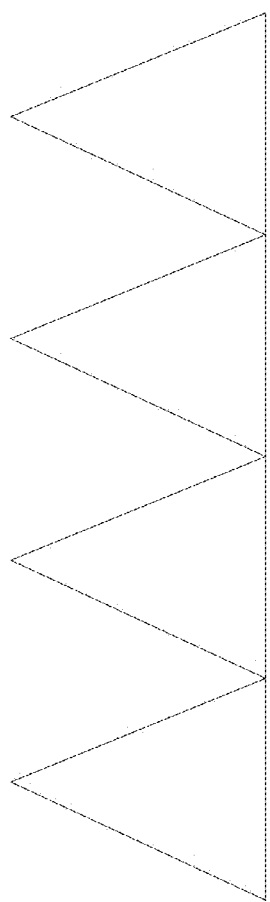
FIG. 9A and FIG. 9B are schematic diagrams showing how the focus indexes are distributed by the use of multiple phase shifting in a phase-shifting structured light pattern projection according to the present disclosure.
Figure 9B:
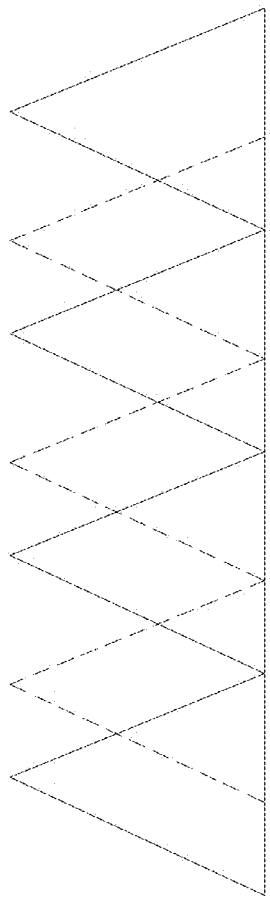

Accordingly, by the phase shifting process described in step 33 of FIG. 6, the edge boundary of the black and white patterns can be shifted by a distance d, as shown in FIG. 8D to FIG. 8F. As the location 93 of the patterned image are enabled to lie exactly on the edge boundary of the black and white patterns as shown in FIG. 8D after the checkerboard pattern of the structured light has been shifted, the location 93 will respond high-frequency signals and thus focus indexes can be obtained, as illustrated in the area 94 of FIG. 8F. Please refer to FIG. 9A and FIG. 9B, which are schematic diagrams showing how the focus indexes are distributed by the use of multiple phase shifting in a phase-shifting structured light pattern projection according to the present disclosure. FIG. 9A exemplifies the result of one phase shifting whose focus indexes will be distributed exactly as the combination of FIG. 8C and FIG. 8F. It is noted that the times of phase shifting are not limited by the aforesaid embodiment, that there can be multiple phase-shifting for increasing measurement resolution as that shown in FIG. 9B. In FIG. 9B which exemplifies the distribution of focus index after two times of phase shifting, the areas corresponding to focus indexes are increasing by that higher measurement resolution is achieved.

The principle provided for shifting the polarized structured light pattern in the foregoing embodiment is capable of increasing the edge boundary of the black and white patterns of the structured light on the object's surface so as to greatly increase high-frequency signals of the images associated with the structured light projected on the surface of the object so that the spatial resolution after reconstructing the surface profile of the object is optimized and, thereby, effectively solve the problem of insufficient spatial resolution of the prior measurement. It is noted that the times of effective phase-shifting is controlled within the period of the micro structured-light patterns modulated by the optical grating. It is noted that more phase shifting, the higher measurement resolution can be achieved. In addition to the phase shifting to increase the spatial resolution, alternatively, the methods shown in FIG. 1A and FIG. 6 can also respectively utilize a step of changing the period defined in the micro structured-light patterns so as to changing the measurement resolution for reconstructing the surface profile of the object.

Figure 10:
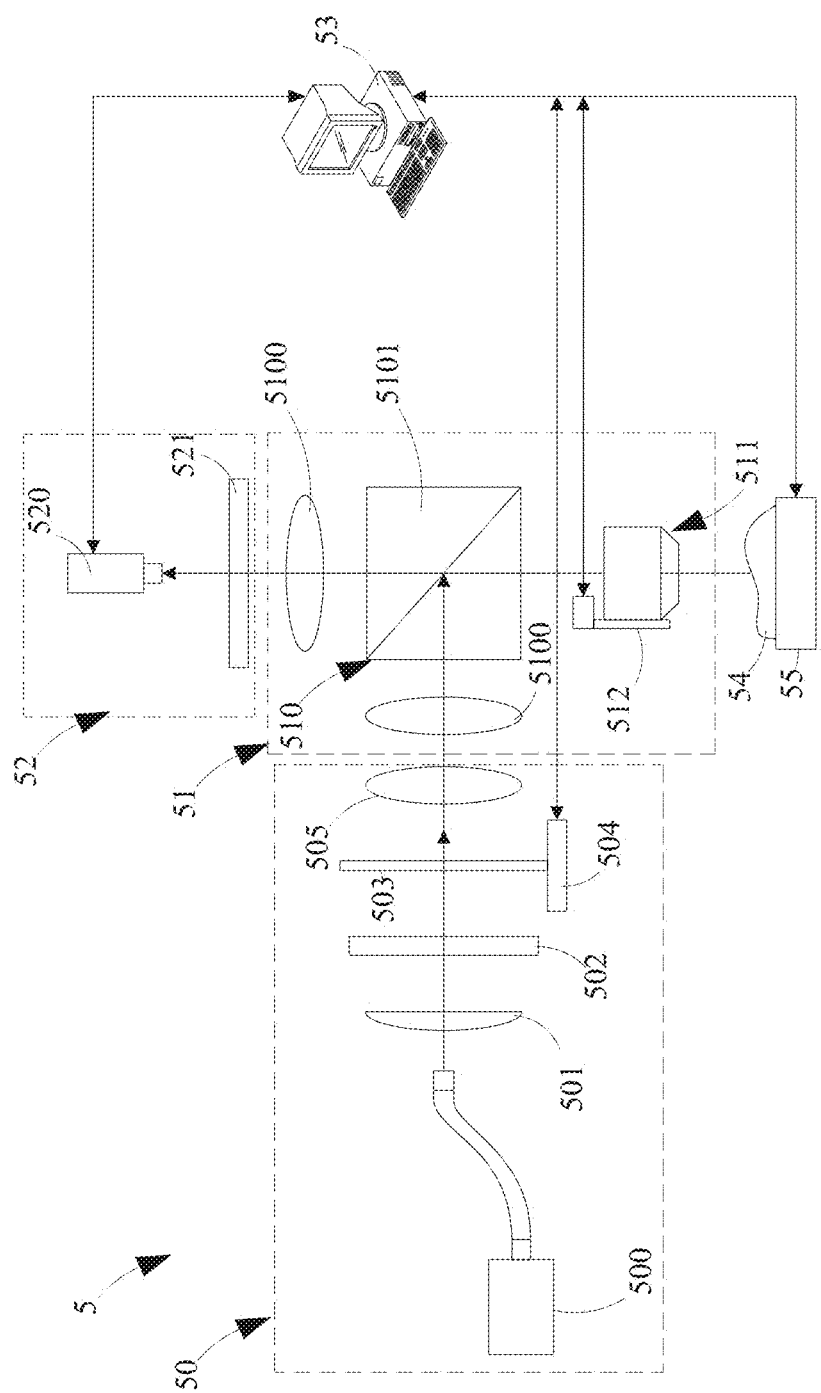
FIG. 10 is a schematic diagram showing a three-dimensional confocal microscopic system according to an embodiment of the present disclosure.
Figure 11:
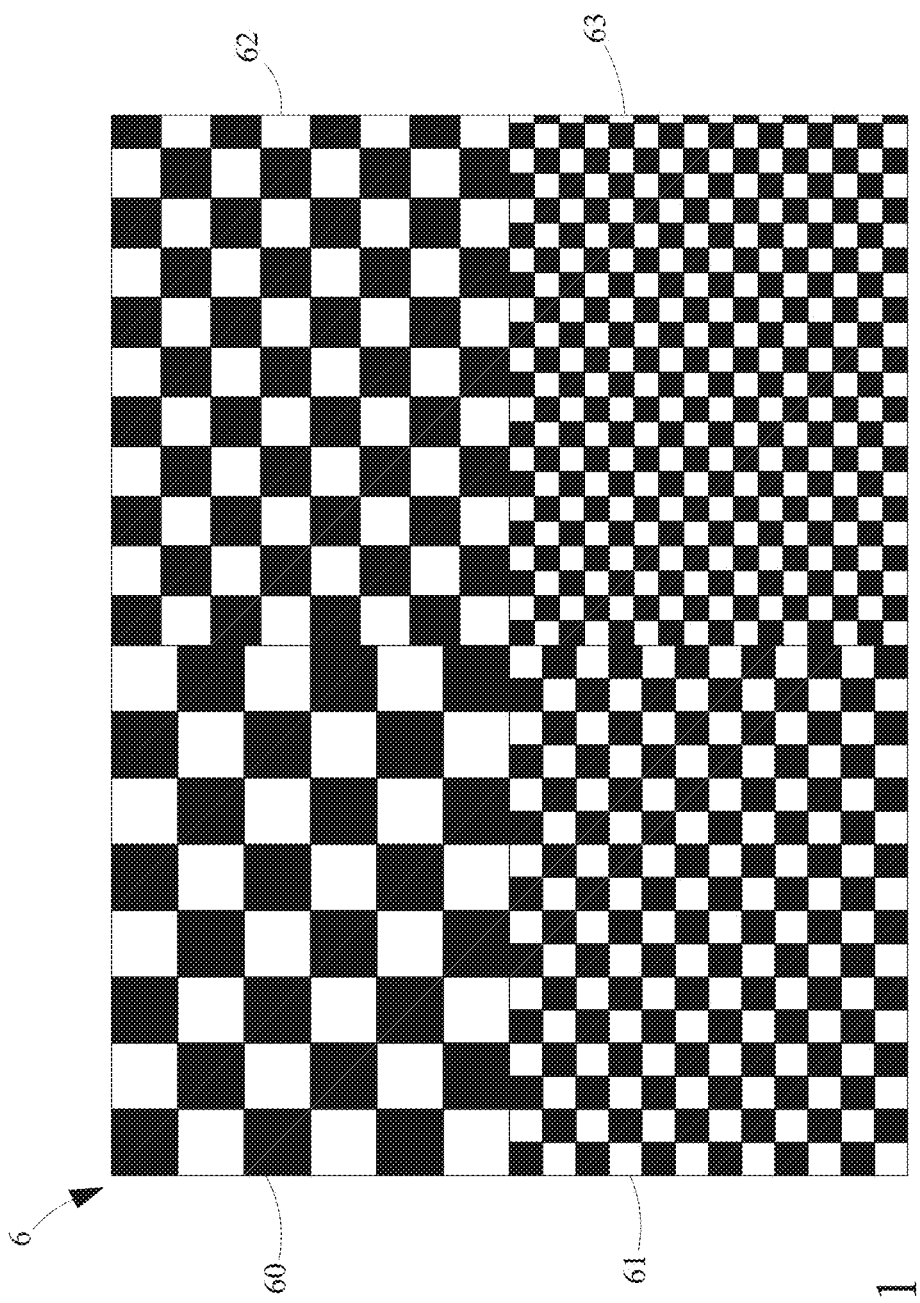
FIG. 11 is a schematic diagram showing an optical grating used in an embodiment of the disclosure.

Please refer to FIG. 10, which is a schematic diagram showing a three-dimensional confocal microscopic system according to an embodiment of the present disclosure. The three-dimensional confocal microscopic system 5 comprises: a polarization module 50, a microscopic objective lens module 51, a linear-polarizing imaging module 52 and a control module 53. In this embodiment, the polarization module 50, being used for providing a linear-polarizing structured light with a pattern, further comprises a light source 500, a plain-convex lens 501, a first linear polarizer 502, an optical grating 503 and a biconvex lens 505, wherein the light emitted from the light source 500 is guided by an optical fiber to project onto the plain-convex lens 501 which collimates the light into parallel light passing through the first linear polarizer 502 and thereby being modulated into a polarized light. Moreover, The optical grating 503, being mounted on a driver 504, is used for modulating the polarized light into a linear-polarizing structured light with a pattern, wherein the driver 504, coupled to the control module 53, is capable of controlling the optical grating 503 to perform a one-dimensional linear displacement movement according to a control signal provided from the control module 53 such that the position of the optical grating is changed for shifting the structured light with pattern. In this embodiment, the optical grating 503 is formed with a periodic pattern as the checkerboard pattern shown in FIG. 2A. Alternatively, the pattern can be, but should not be limited to, a sinusoid pattern, or a stripe pattern. The biconvex lens 505 is used for focusing the linear polarized light onto the microscopic objective lens module 51. In another embodiment shown in FIG. 11, the optical grating 6 is composed of four patterned areas of different periods 60~63, by that structured light of different patterns or different period can be generated simply by the control of the driver 504 for driving the optical grating 6 to move.

The microscopic objective lens module 51, used for projecting the linear-polarized structured light with pattern onto an object 54 so as to form a plurality of beams containing focus information, further comprises a lens set 510 and an objective lens 511. The lens set 510 is composed of a plurality of optical elements, which includes a plurality of biconvex lens 5100 and a beam splitter 5101. The objective lens 511, disposed at a position between the beam splitter 5101 and the object 54, is further coupled to a linear driver 512, such as a piezoelectric driver, for example, which is further electrically connected to the control module 53 so as to drive the objective lens 511 to perform a vertical displacement movement for scanning the object 54. Moreover, the object 54 is placed on a mobile platform 55, which is also capable of carrying the object 54 to perform at least a one-dimensional movement according to control signals from the control module 53. In addition, the linear-polarizing imaging module 52 further comprises an imaging device 520 and a second linear polarizer 521. The imaging device 520 is designed for detecting the plurality of beams containing focus information so as to form a series of images with respect to the vertical scanning operation, and it can be a CCD device or a CMOS device. The control module 53 is used for controlling the objective lens 511 to perform a vertical displacement movement while directing the linear-polarizing imaging module 52 to capture the series of images during the vertical displacement movement. Moreover, the control module 53 is capable of executing the steps described in FIG. 1A or FIG. 6 for processing the series of images and thus reconstructing the surface profile of the object accordingly.

Figure 12:
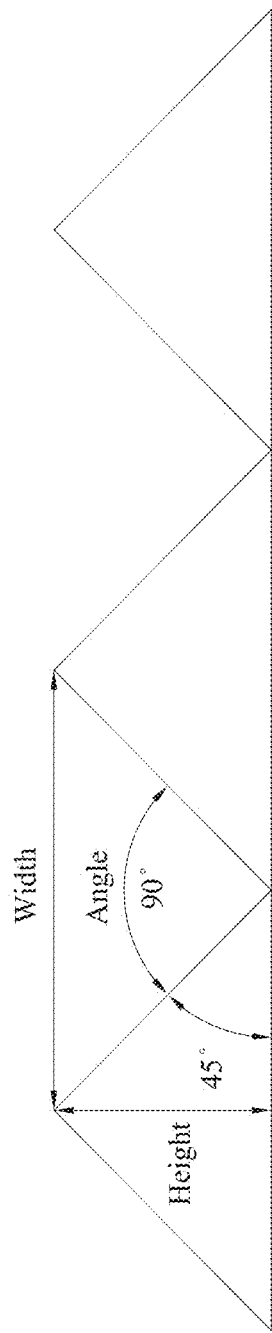
FIG. 12 is a schematic diagram showing a reference target having 45° V-groove microstructures used in the present disclosure.
Figure 13C:
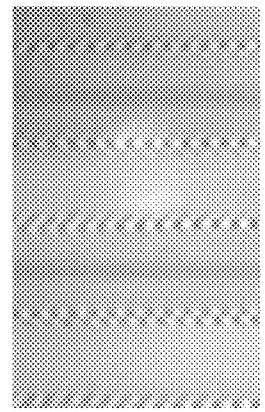
FIG. 13A to FIG. 13F are a series of images obtained during a vertical scanning process according to the present disclosure.
Figure 13F:
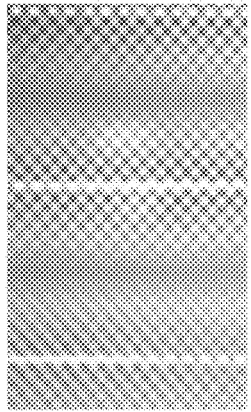
Figure 13B:
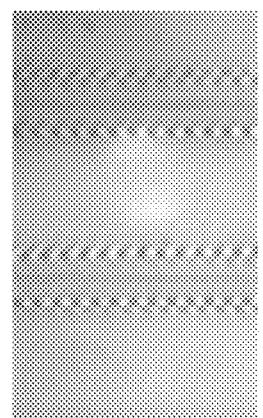
Figure 13E:
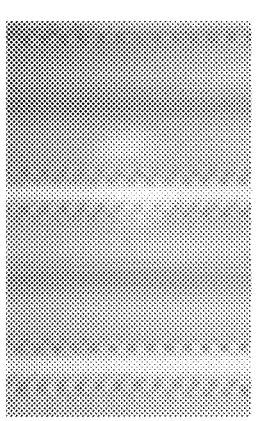
Figure 13A:
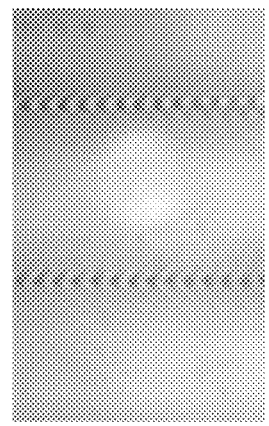
Figure 13D:
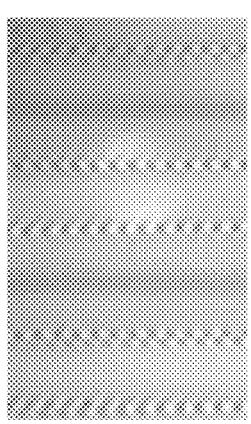
Figure 14:
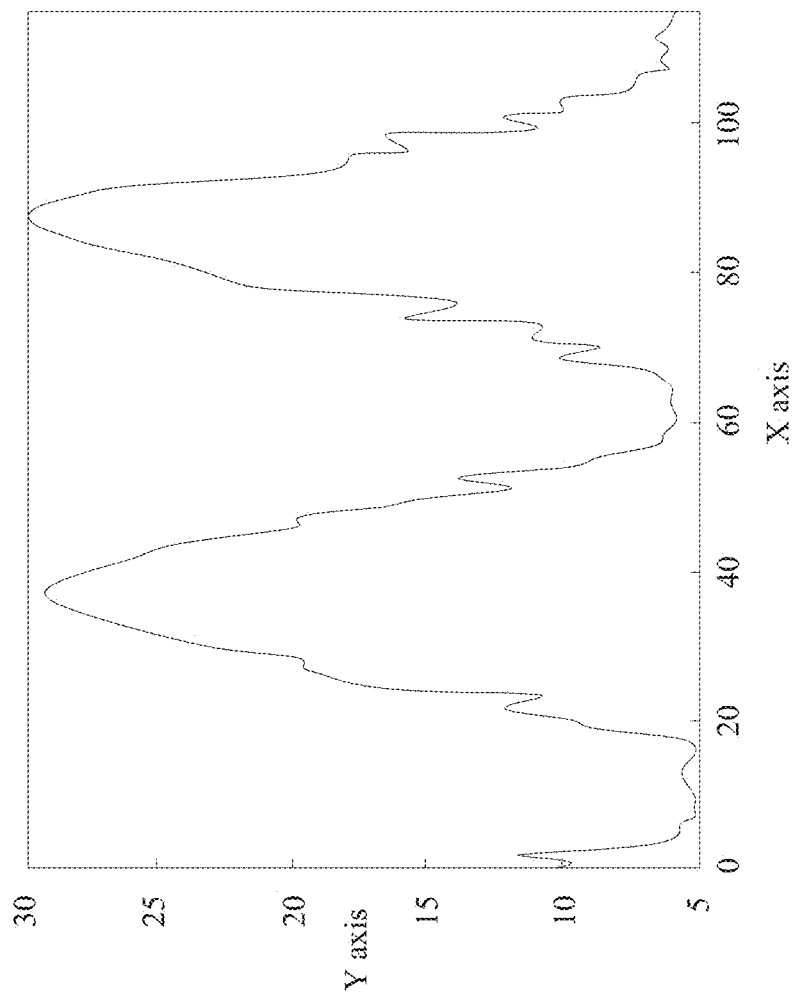
FIG. 14 is a schematic diagram showing a profilometry obtained without the use of linear-polarizing device in the present disclosure.

To avoid spectacular light reflecting from the various layers of the measured microstructure, the first and second linear polarizers 502 and 521 are installed in the system of the present disclosure, wherein the polarizing axis of the first linear polarizer 502 is angled with the polarizing axis of the second linear polarizer 521. For illustrating the aforesaid problem of unwanted signals from various layers of the measured microstructure, a reference target having 45° V-groove microstructures (depicted in FIG. 12) are measured by the developed system. In the experimental setup, an optical objective with magnification of ×50 and NA of 0.95 and a grating of 30*30 ($\mu m^2$) checkerboard pattern were used for the task. The scanning interval of the vertical scanning was 0.2 $\mu m$. A total of 170 images (some as shown in FIG. 13A~FIG. 13F) were acquired through the vertical scanning within a reasonable time frame. It is clearly noted that a significant total-light-reflection happens at the image shown in FIG. 13F when the scanning process is reaching near the bottom of the micro-V-groove. In this case, the real peak signal is easily mixed with the non-interested signal along the vertical z-axis, as those shown in FIG. 15, which will severely degrade the 3-D surface profile reconstruction of the object, as shown in FIG. 14. It is known that when a total light reflection happens as the light paths between the two triangular side surfaces are symmetric, the reflected light is sensed by the image sensor at the same optical paths, and due to this signal ambiguity, there are more than one signal peaks to be existing in the DRC. Sometimes, the intensity of non-interested noise is even significant than the correct peak, so the measurement result of 3-D surface profilometry on such a microstructure may be severely degraded.

Figure 16B:
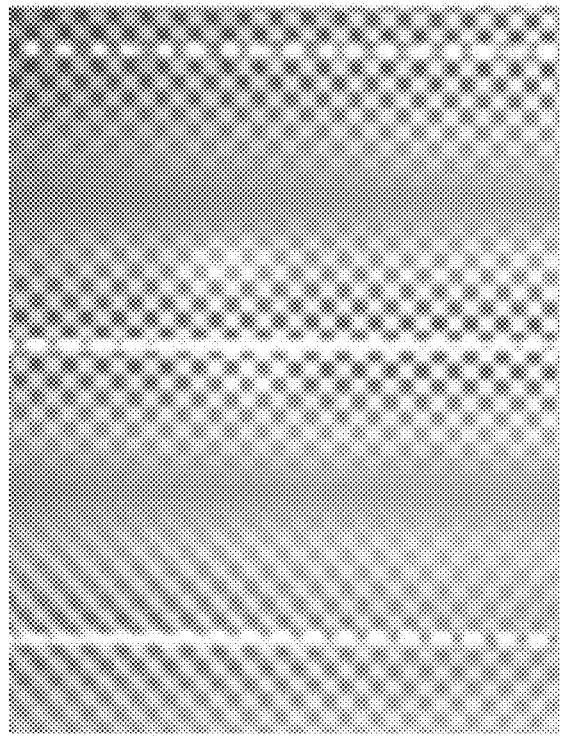
FIG. 16A and FIG. 16B are images obtained without the use of linear-polarizing device and after the use of linear-polarizing device in the present disclosure.
Figure 16A:
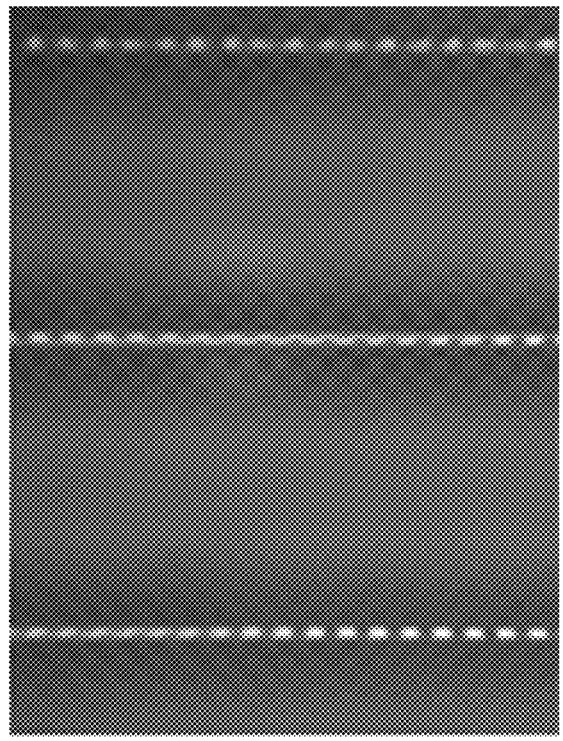

To overcome the aforesaid problem of signal ambiguity happened when the vertical scanning process is reaching near the bottom of the micro-V-groove, the polarization of the undesired spectacular reflection light is controlled by employing two linear polarizers 502, and 521, which form a specific angle between their polarizing axis in the system for minimizing the adverse influence of the non-interested noise. Please refer to FIG. 16A and FIG. 16B, which are images obtained without the use of linear-polarizing device and after the use of linear-polarizing device when the vertical scanning process is reaching near the bottom of the micro-V-groove.

Figure 15:
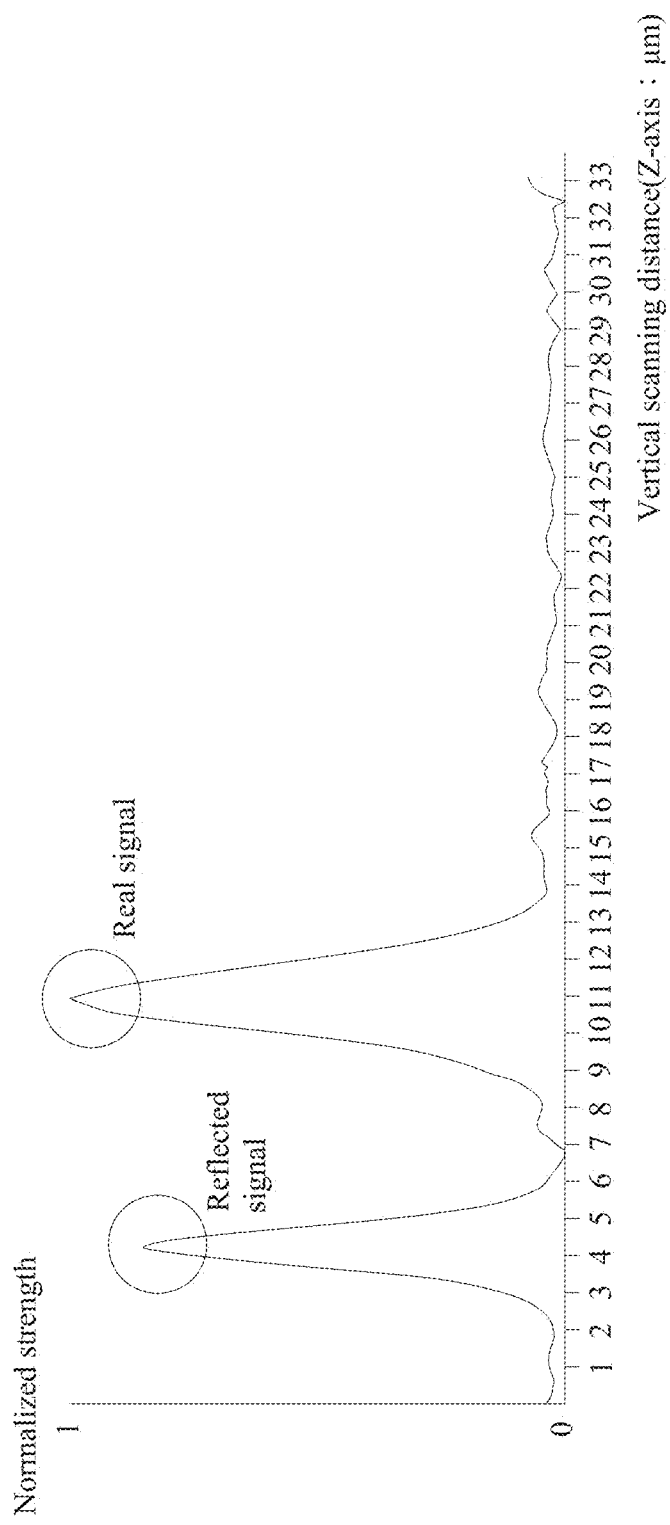
FIG. 15 shows an exemplary depth response curve obtained when there are non-interested signals caused by total-light-reflection.
Figure 17:
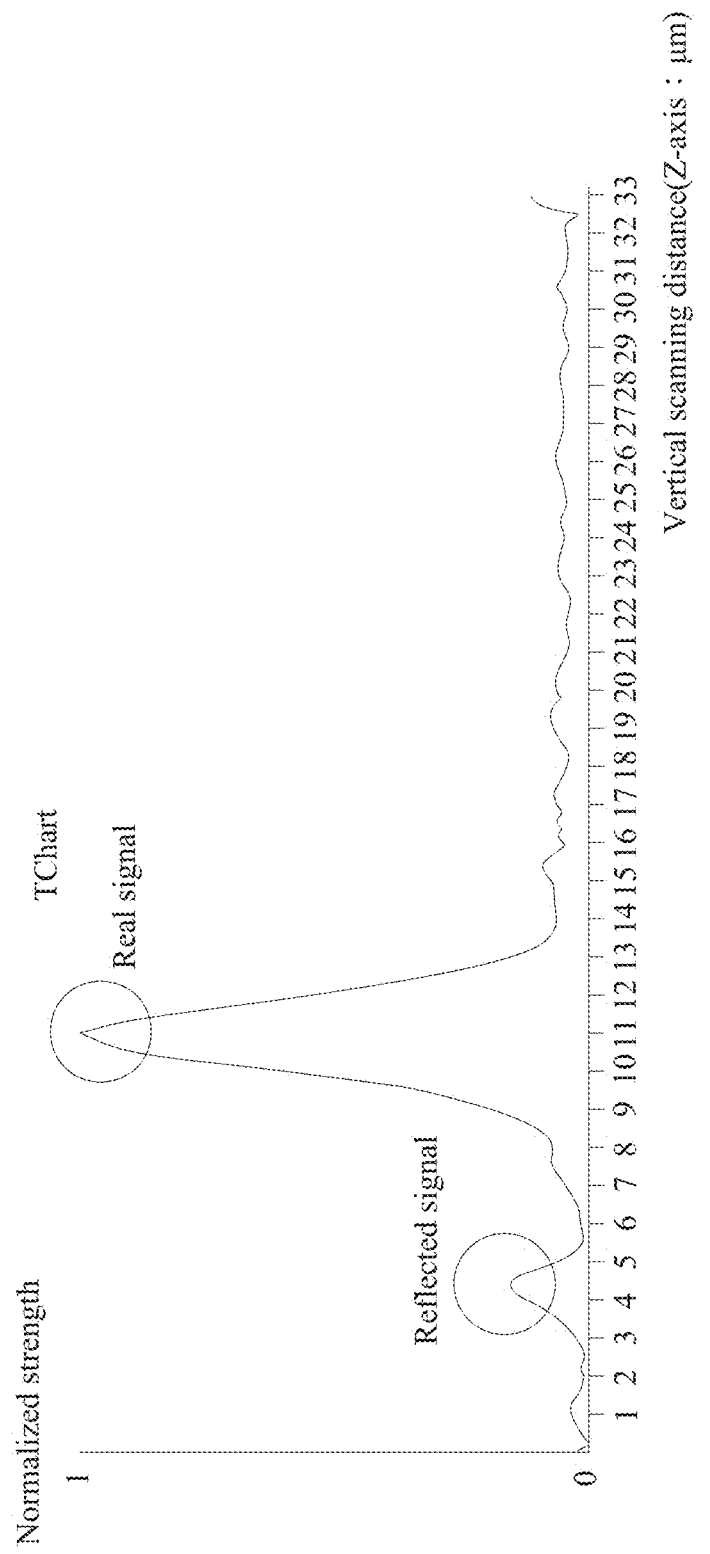
FIG. 17 shows an exemplary depth response curve obtained when there are two linear-polarizing devices are used in the present disclosure.
Figure 18:
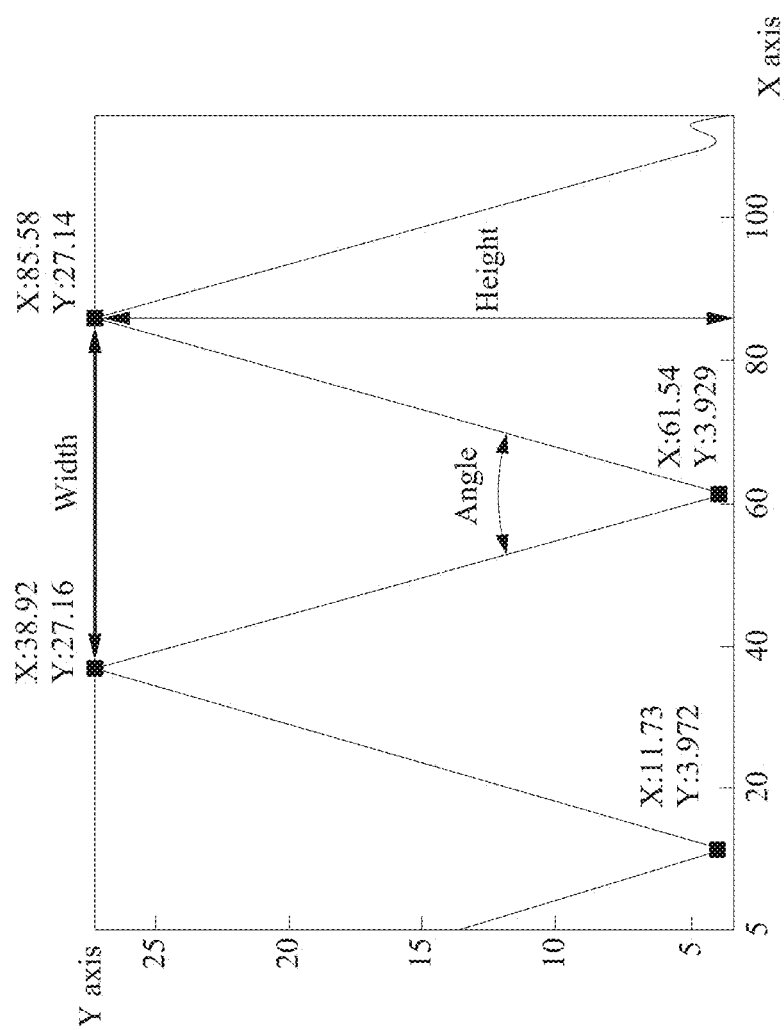
FIG. 18 is a schematic diagram showing a profilometry obtained after using linear-polarizing device in the present disclosure.

The DRC acquired by the use of the two polarizers 502, and 521 can be exemplified by the curve shown in FIG. 17, in which a significant peak can be easily detected comparing with that shown in FIG. 15. Accordingly, the surface profile reconstruction resulting from the DRC of FIG. 17 that uses two polarizers 502, 521, as shown in FIG. 18, is much better than that shown in FIG. 14.

With respect to the above description then, it is to be realized that the optimum dimensional relationships for the parts of the disclosure, to include variations in size, materials, shape, form, function, manner of operation, and assembly and use, are deemed readily apparent and obvious to one skilled in the art, and all equivalent relationships to those illustrated in the drawings and described in the specification are intended to be encompassed by the present disclosure.

What is claimed is:

1. A method for three-dimensional polarization-based confocal microscopy, comprising the steps of:
    providing a light source for emitting a beam;
    enabling the beam to pass through a first linear polarizer and an optical grating containing a structured pattern so as to generate a linear-polarizing structured light, wherein the optical grating is coupled to a linear driver which is coupled to a control module, and thereby, controlled by a signal provided from the control module for driving the optical grating to perform at least one-dimensional linear displacement movement so as to change a position of the optical grating and thereby shift the linear-polarizing structured light during the one-dimensional linear displacement movement;
    projecting the linear-polarizing structured light onto a surface of an object so as to form a plurality of beams containing focus information;
    performing a vertical scanning process upon the object;
    capturing the plurality of beams containing focus information during the vertical scanning process so as to form a series of images by a linear-polarizing imaging module; and
    analyzing the series of images for reconstructing a surface profile of the object.

2. The method of claim 1, wherein the linear-polarizing structured light has a linear-polarizing pattern selected from the group consisting of: a checkerboard pattern, a sinusoid pattern, and a stripe pattern.

3. The method of claim 1, further comprising a step of phase shifting of the linear-polarizing structured light.

4. The method of claim 3, wherein an amount of the phase shifting is ranged within a period of the pattern.

5. The method of claim 1, wherein the structured pattern of the optical grating is selected from the group consisting of: a checkerboard pattern, a sinusoid pattern, and a stripe pattern.

6. The method of claim 1, wherein the plurality of beams containing focus information further pass through a second linear polarizer having a polarizing axis being angled with respect to a polarizing axis of the first linear polarizer.

7. The method of claim 1, wherein the light source is provided by using a digital light projector (DLP) projecting a structured light with a pattern onto the first linear polarizer.

8. The method of claim 1, wherein the reconstruction of the surface profile of the object further comprises the steps of:
    obtaining a plurality of focus indexes respectively corresponding to a plurality of windows formed by each inspected pixel of every image in the series of images;
    forming a depth response curve with respect to the corresponding inspected pixel in each image according to the focus indexes;
    locating a peak of each depth response curve; and
    reconstructing the surface profile of the object according to the scanning depth with respect to the peaks.

9. The method of claim 1, further comprising a step of changing a period defined in the pattern.

10. A system for three-dimensional polarization-based confocal microscopy, comprising:
    a polarization module, for providing a linear-polarizing structured light with a pattern, comprising:
        a light source, for emitting a light;
        a first polarizer, for polarizing the light; and
        an optical grating having a structured pattern, for modulating the polarized light into the linear-polarizing structured light with the pattern;
    a microscopic objective lens module, for projecting the linear-polarizing structured light onto an object having a surface profile so as to form a plurality of beams containing focus information;
    a linear-polarizing imaging module; and
    a control module, for controlling a displacement device to perform a vertical scanning operation, acquiring the plurality of beams to form a series of images containing focus information by the linear polarizing imaging module during the vertical scanning operation, and processing the series of images containing focus information for reconstructing the surface profile of the object;
    wherein the optical grating is coupled to a linear driver which is coupled to the control module, and thereby, controlled by the signal provided from the control module for driving the optical grating to perform at least one-dimensional linear displacement movement so as to change a position of the optical grating and thereby shift the linear-polarizing structured light during the one-dimensional linear displacement movement.

11. The system of claim 10, wherein the structured pattern of the optical grating is selected from the group consisting of: a checkerboard pattern, a sinusoid pattern, and a stripe pattern.

12. The system of claim 10, wherein an amount of the shifting is ranged within a period of the pattern.

13. The system of claim 10, wherein the microscopic objective lens module further comprises:
    a lens set, composed of a plurality of optical elements; and
    an objective lens, disposed between the lens set and the object and coupled to the displacement device electrically connected to the control module, wherein the objective lens is further driven by the displacement device to perform the vertical scanning operation.

14. The system of claim 10, wherein the linear-polarizing imaging module further comprises:
    a second linear polarizer; and
    an imaging device.

15. The system of claim 10, wherein the control module is designed to perform a process containing the steps of:
    obtaining a plurality of focus indexes respectively corresponding to a plurality of windows formed by each inspected pixel of every image in the series of images;
    forming a depth response curve with respect to the corresponding inspected pixel in each image according to the focus indexes;
    locating a peak of each depth response curve; and
    reconstructing the surface profile of the object according to the scanning depth with respect to the peaks.

16. The system of claim 10, wherein the polarization module is capable of generating various structured lights having different pattern periods.

17. The system of claim 10, wherein the object is placed on a platform performing at least a one-dimensional movement according to control signals from the control module.

* * * * *